Nov. 23, 1965   J. C. BLAINE   3,219,209
APPARATUS FOR DELIVERING FUSIBLE MATERIAL TO
A GLASS MELTING FURNACE

Filed June 18, 1962   3 Sheets-Sheet 1

INVENTOR.
John C. Blaine
BY
Hobbe & Swope
ATTORNEYS

Nov. 23, 1965     J. C. BLAINE     3,219,209
APPARATUS FOR DELIVERING FUSIBLE MATERIAL TO
A GLASS MELTING FURNACE
Filed June 18, 1962     3 Sheets-Sheet 3

INVENTOR.
John C. Blaine
BY
Nobbe & Swope
ATTORNEYS

United States Patent Office 3,219,209
Patented Nov. 23, 1965

3,219,209
APPARATUS FOR DELIVERING FUSIBLE MATERIAL TO A GLASS MELTING FURNACE
John C. Blaine, Ottawa, Ill., assignor to Libbey-Owens-Ford Glass Company, Toledo, Ohio, a corporation of Ohio
Filed June 18, 1962, Ser. No. 203,287
8 Claims. (Cl. 214—35)

This invention relates broadly to the art of glass making and more particularly is concerned with an improved feeder apparatus for delivering fusible material in broken or granular form, e.g., cullet glass, to a glass-melting tank-furnace.

According to one known manner of supplying batch materials to a glass-melting tank-furnace, scrap glass or cullet is discharged at the "dog-house" or charging end of the furnace at a substantially continuous rate onto the upper surface of a molten glass pool confined by the walls of the dog-house. The cullet is discharged laterally across the end area of the dog-house in an attempt to afford a substantially evenly distributed layer which is carried in the forwardly moving molten glass. Raw pulverulent batch materials are then delivered from a hopper to a continuously rotating, compartmented roll or vaned cylinder and thence onto the layer or stratum of cullet glass to form a blanket-like layer that extends substantially from one side wall of the dog-house to the opposite side wall.

The cullet glass is normally fed from a supply hopper onto an inclined fixed pan or plate arranged above the end wall of the dog-house with little or no special effort made to distribute the cullet evenly thereacross. Such a feeding procedure has been found to result in irregular amounts of cullet being delivered to the molten glass pool across the charging end of the furnace and the formation of piles or heaps of the cullet immediately below the pan instead of the desired layer of substantially uniform thickness.

In an endeavor to improve this situation, it has been proposed to include a secondary surface or platform between the cullet hopper and the fixed delivery pan which is adapted to vibrate or oscillate continuously during feeding of the cullet. The resulting motion which is imparted to the cullet is intended to somewhat shift and distribute the loose particles thereof and prevent sporadic delivery and the accompanying formation of heaps of cullet on the molten bath due to the achievement of a more regular and uniform rate of feeding. To further improve this feeding operation, however, and particularly to better control the lateral distribution of the cullet across the charging zone, it is herein proposed to provide a means or device which is cooperatively associated and coacts with a rocking trough and functions to insure that during the downward movements of the trough more regulated or measured quantities of the cullet will be discharged therefrom.

A principal object of the present invention is, therefore, the provision of an improved feeding apparatus for delivering fusible material in broken or granular form to the charging end of a glass-melting tank-furnace.

Another object of the invention is to provide a feeding apparatus of the above character which is effective to deliver controlled, predetermined quantities of fusible material to a molten glass bath.

More particularly, it is a further object of the invention to provide an apparatus for the blanket feeding of cullet glass onto the surface of a molten glass bath in the charging zone of a glass-melting tank-furnace which includes novel means for assuring that a substantially uniform quantity or layer thickness of cullet is delivered across essentially the entire width or lateral dimension of the charging zone during the feeding cycle thereof.

Other objects and advantages of the invention will become more apparent during the course of the following description when taken in connection with the accompanying drawings.

In the drawings, wherein like numerals are employed to designate like parts throughout the same:

FIG. 6 is a fragmentary perspective view of one end of the feeding apparatus in accordance with the invention.

Figure 1:
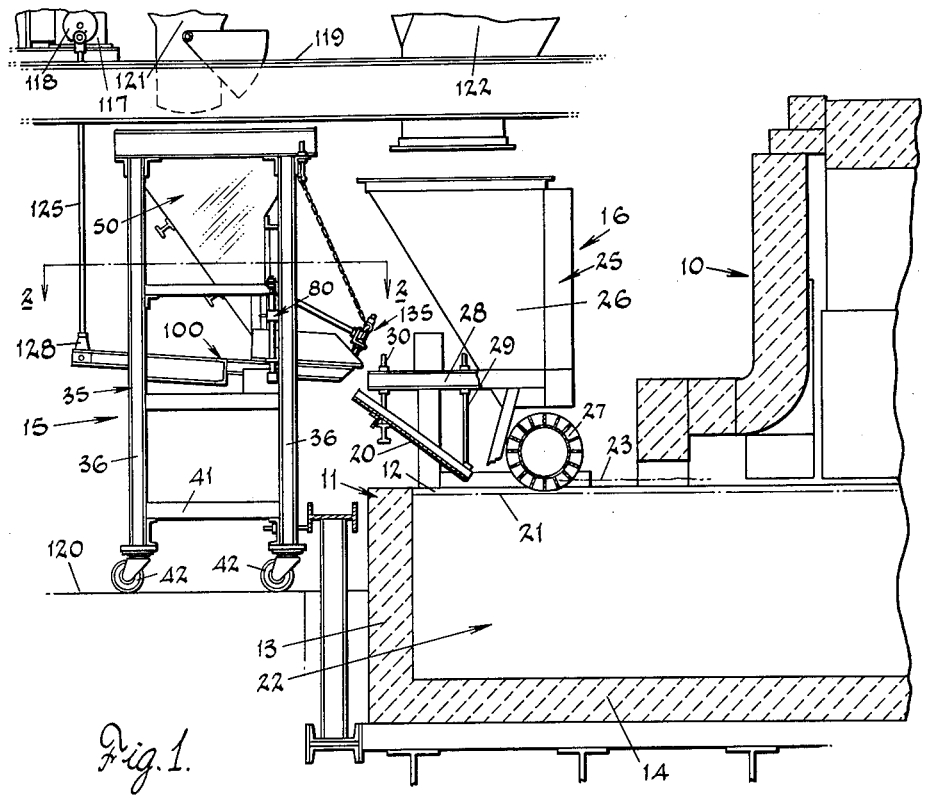
FIG. 1 is a broken, longitudinal vertical sectional view of the batch supplying or charging end of a glass-melting tank-furnace including the novel cullet glass feeding apparatus constructed in accordance with the invention.

Referring now more particularly to the drawings, there is shown in FIG. 1 a conventional, continuous type glass-melting tank-furnace, designated in its entirety by the numeral 10, and including a charging end or dog-house area 11 defined by side walls 12, an end wall 13 and a bottom wall or floor 14. A cullet feeding apparatus constructed in accordance with the present invention and generally designated by the numeral 15 is disposed adjacent the end wall 13 with a source of supply for the raw pulverulent batch material, indicated generally at 16, being positioned just forwardly of the cullet feeder.

Briefly stated, cullet material is discharged into a pan or trough 20 arranged above the end wall 13 of the dog-house and, upon falling onto the upper level or surface 21 of the molten glass bath 22, is moved forwardly therewith beneath a batch source 16 so that the raw pulverulent materials comprising the batch will be received thereon to form a substantially continuous blanket-like layer indicated by the broken line 23. The batch source 16 is believed to be entirely conventional in structure and operation and forms no part of the instant invention. In this respect, such sources are known to include a frame structure 25 on which is supported a hopper 26 for receiving quantities of batch material and a substantially continuously rotating, compartmented roll or vaned cylinder 27 which is adapted to deposit the pulverulent material onto the layer of cullet glass and upper area of the molten glass bath.

As herein disclosed, the trough 20, which extends transversely across the charging zone or dog-house 11 substantially from one side wall 12 to the other, is carried from a horizontally disposed beam 28 of the support structure 25 by means of threaded rods 29 and 30, it being understood that the arrangement of FIG. 1 is typical at each side wall 12 of the dog-house 11 although only one pair of rods 29 and 30 are illustrated. The rods 29 are pivotally connected to the forwardly or inwardly disposed lower end of the trough with the rods 30 having associated therewith a bar 31 on which the outer or rearwardly disposed upper end of the trough is supported. Thus, and by use of adjusting nuts 32 and 33, both the overall elevation of the trough 20 and its angle with respect to the horizontal may be changed as desired.

Figures 4, 5:
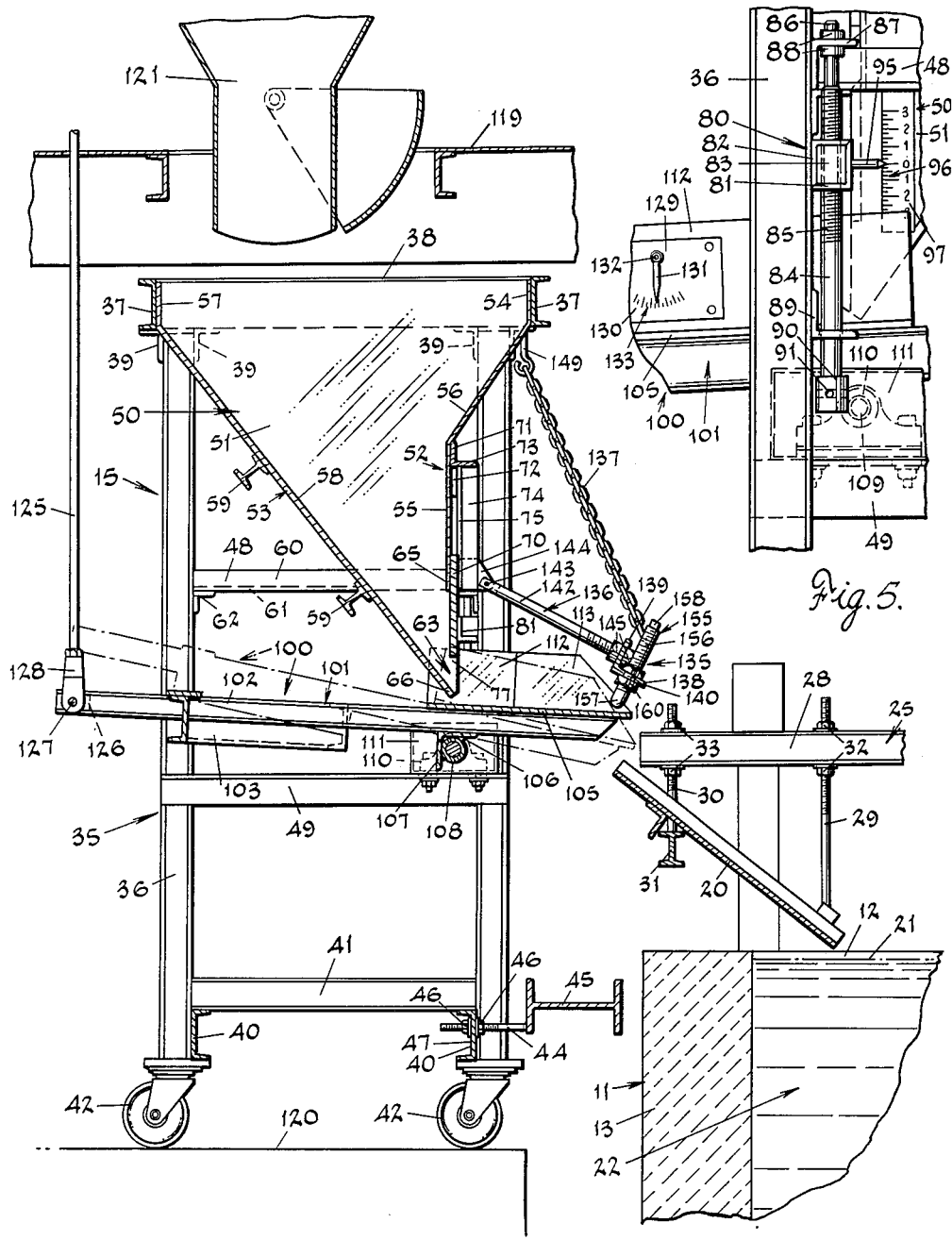
FIG. 4 is a transverse, vertical sectional view of the apparatus taken on line 4—4 of FIG. 3.
FIG. 5 is a detail view of a regulating device employed in the apparatus.

With more specific reference now to the cullet feeding apparatus 15, there is provided a rectangular frame structure, generally designated by the numeral 35, and including vertically disposed corner columns 36, opposed pairs of longitudinally and transversely arranged beams or channels 37 and 38, carried at the upper ends of the columns 36 on brackets 39, and similar longitudinal and transversely disposed channels 40 and 41 respectively interconnecting the lower ends of the columns. The frame 35 is adapted to be moved into and out of operative position with respect to the dog-house end wall 13 by means of rollers or casters 42 supporting the lower end of each vertical column 36. As shown in FIG. 4, the forwardly disposed lower channel 40 is provided with spaced slots 43 through which bolts 44 are passed when the feeding apparatus is properly located; the bolts 44 being secured to a beam 45 of the main furnace support structure. Each bolt 44 carries nuts 46 on the opposite sides of web 47 of the channel 40 to lock the apparatus 15, as a whole, in a fixed position. Also forming structural parts of the frame 35 are pairs of transversely disposed members or angle irons 48 and 49 employed for purposes to be hereinafter more fully described.

The frame 35 carries a hopper 50 having oppositely disposed side walls 51, a forward wall 52 and a rear wall 53. The forward wall 52 includes an upper vertical section 54, a lower vertical section 55 and an angularly disposed section 56 therebetween. The rear wall 53, on the other hand, is formed with an upper vertical section 57 and a major inclined wall section 58 that is reinforced by horizontal, longitudinally disposed bracing bars 59. The hopper 50 is firmly secured to the frame 35 at its upper end by welding or the like of the upper margins of the side walls 51 to the adjoining transverse channels 38; the upper wall section 54 of forward wall 52 to a channel 37; and the upper wall section 57 of rear wall 53 to the opposite channel 37. Further support for the hopper 50 is afforded by the angle irons 48 that are secured by suitable means at their vertical legs 60 to the respective hopper side walls 51. In this respect, each angle iron 48 is affixed at its ends through the horizontal leg portion thereof 61 to a bracket 62 secured to the adjoining vertical column 36.

As best seen in FIG. 4, it will be noted that the inclined forward wall section 56 of the hopper and the major inclined rear wall section 58 cooperate to direct cullet material received therebetween downwardly toward a discharge opening, indicated by the reference numeral 63, and defined by the side walls 51, the lower end 65 of the forward wall section 55, and the end 66 of the wall section 58. The vertical dimension of the actual discharge area of the opening or orifice 63 is controlled by a valve plate 70 that is supported for vertical movement relative to the outer surface of forward wall section 55. For this purpose, a horizontally disposed bracing angle 71 is secured to the outer surface of the forward wall 52 substantially at the juncture of the lower vertical section 55 and the inclined wall section 56 and spacer blocks 72 are secured to the wall section 55 directly beneath the horizontal leg portion 73 of bracing angle 71 at longitudinally spaced points therealong.

Affixed to each of the blocks 72 and the adjoining surface of the angle 71 are vertically disposed keeper members formed by angles 74. The inwardly directed surface of legs 75 of the angles 74 are thus located in spaced relation to the outwardly directed surface of wall section 55 and together serve to define a runway therebetween in which the valve plate 70 is confined for sliding, vertical movement. As viewed in FIGS. 5 and 6, the lower marginal edge of each hopper side wall 51 is formed to provide a forwardly directed flange area 77 against which the vertical edges of the valve plate 70 are slidably received. Each flange area has a length approximately equal to the full open dimension of the orifice 63.

Figure 3:
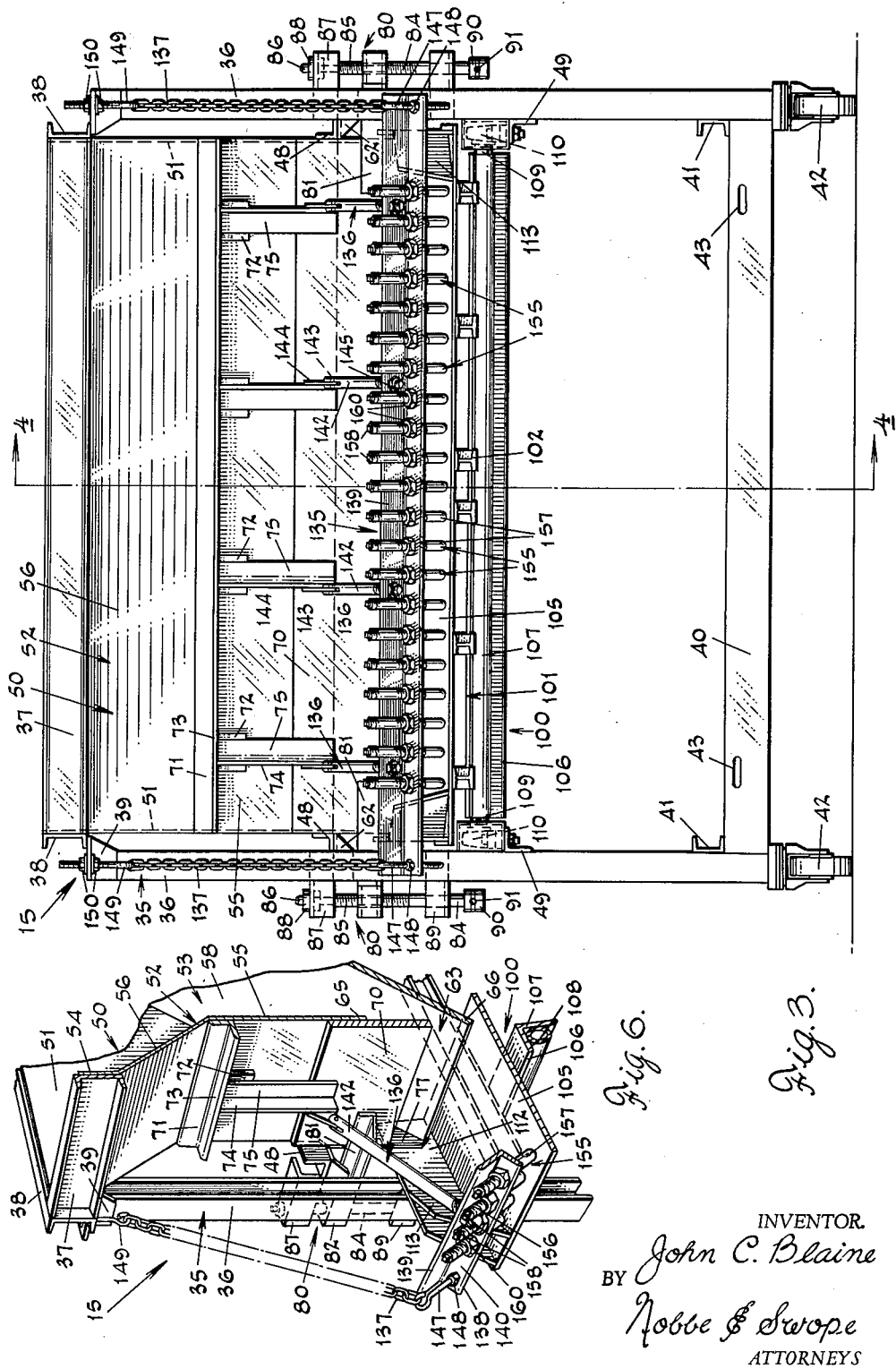
FIG. 3 is a front elevational view of the feeding apparatus.

The valve plate 70 is adapted to be adjustably located to define the actual open area of the hopper orifice 63 by means of regulating devices, generally designated by the numeral 80 and best shown in FIGS. 3, 5 and 6. Each of these devices 80 includes a horizontally disposed bar 81 attached at its inner end to the oppositely disposed end areas of the valve plate 70. The outer end of each bar 81 is formed by an integral angular clip 82 to securely hold an internally threaded block 83 which in turn receives a rod 84 having a screw portion 85. Each rod 84 is provided at its upper end with an unthreaded annular portion 86 of reduced diameter which extends through a bracket 87 attached to the adjacent forwardly disposed column 36 and is supported for rotary movement therein by collars 88. The lower ends of the rods 84 extend loosely through stabilizing brackets 89 attached to columns 36 and are provided therebeneath with apertured adjusting heads 90. The apertures or openings 91 of the heads 90 are adapted to receive a suitable tool whereby the rods 84 can be turned to move the associated block 83 upwardly or downwardly along the rods thereby raising or lowering the valve plate 70 through rigidly attached bars 81.

With operators manipulating each rod 84 simultaneously, the valve plate 70 can thus be moved to adjust the vertical dimension of the orifice 63 across the hopper 50 to that desired. This can be visually estimated, or the extent of vertical movement of the plate accurately determined by the movement of a pointer 95 affixed to each bar 81 with reference to a scale 96 printed on a plate 97 secured to the outer surface of each of the hopper side walls 51.

Figure 2:
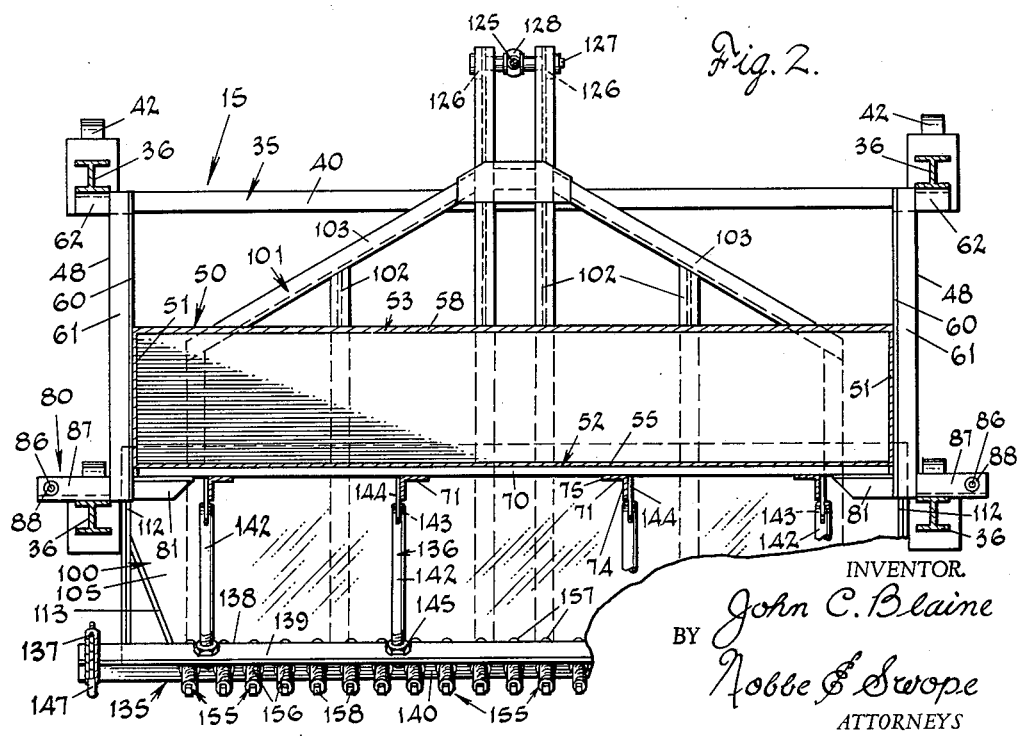
FIG. 2 is a broken, horizontal sectional view taken along the line 2—2 of FIG. 1.

A discharge pan 100 is pivotally mounted on the frame structure 35 beneath the hopper 50 to receive the cullet material as it falls through the orifice 63. As viewed in FIGS. 2 and 4, the pan 100 includes a framework 101 composed of suitable structural members 102 extending transversely of the pan and bracing members 103. The centrally disposed pair of members 102 are extended outwardly from the rear end of the general body of the framework 101 for purposes to be hereinafter more fully described, while at the forward end of the framework a planar sheet or plate 105 is fixedly carried by the members 102 on their upper surfaces. The pan is bodily supported by a trunnion member 106 welded to the lower surfaces of the members 102 and comprising an angle iron 107 and a tubular axle 108 secured between the legs of such angle iron. The axle 108 is provided at its opposite ends with secured stub shafts 109 (FIGS. 3 and 5) that are journaled in pillow bearings 110. These bearings are mounted on the pair of angle braces 49 carried by the columns 36 of the frame 35, and are contained within housings 111 and thus protected from dust and other undesired accumulations.

The discharge plate 105 is equipped at its opposite sides with vertically disposed walls 112, and convergently arranged plates 113 are welded or otherwise affixed to the plate and the walls to maintain the flowing cullet material within a discharge area of desired width. In this connection, the plate 105 is mounted with reference to the hopper 50 so that the rearward edge of the plate is disposed behind the lower edge 66 of the hopper wall section 58. In this manner, as cullet is discharged from the hopper orifice 63 and the pan pivoted or rocked as described immediately below, the material tends to slide or move forwardly across the plate to the oppositely disposed forward edge thereof.

The discharge pan 100 is caused to oscillate or pivot about the axis defined by the horizontally aligned shafts 109 by means of a power unit such as is schematically shown at 117 in FIG. 1 and including a crank member 118. This unit, for purposes of illustration, is shown located on a balcony or mezzanine floor 119 above the main plant floor 120 on which the feed apparatus is supported; the floor 119 also being shown as supporting the outlet 121 and chute 122 through which the cullet glass and raw batch materials respectively are delivered from the usual supply bins or like sources.

The crank member 118 is connected to the discharge pan 100 by a link 125 when the feed apparatus 15 is pushed into its operative position. For this purpose, the centrally disposed pair of framework members 102 are provided at their outermost ends with journal blocks 126 having aligned bores for mounting a shaft 127 on which a link coupling 128 is carried. By adjusting the "throw" or stroke distance of the crank 118, the amplitude of the rocking or oscillating movement of the pan 100 can be increased or decreased to the end that, as viewed in FIG. 4, it will oscillate between the substantially horizontal full line position and a second position, indicated in broken line, at which discharge of the cullet glass from the pan 100 downwardly onto the pan or trough 20 at the dog-house is accomplished. If desired, a "tell-tale" pointer can be mounted on the discharge pan 100 to indicate the total scope of its rocking movement and/or the angle of the pan with respect to the horizontal at either limit of its movement. In this respect, an indicator device 129 for this purpose is illustrated in FIG. 5 and includes a plate 130 affixed to a side wall 112 of the pan and a pointer 131 freely pivotally mounted on a pin 132. The plate 130 has inscribed thereon a suitable dial or legend 133 whereby, upon movement of the pan and the dial relative to the pointer 131, an accurate reading of the angle traversed thereby is readily obtained.

It will be appreciated that when cullet glass or like materials of random particle size are contained in a chute or hopper, such as the hopper 50, it is intended that the material fall freely therethrough to the point of exit, such as the hopper orifice 63, to spread out evenly on the discharge pan 100 and, as the pan is swung to the lower limit of its rocking movement, similarly fall from the edge thereof. This is to afford distribution of the batch material in order that a layer of substantially uniform thickness and quantity be obtained in the upper area of the molten glass. This optimum condition, however, has not been found to be so easily, continuously attained, since the cullet may fall more readily toward one side of the hopper or the other, temporarily accumulate in clusters in the vicinity of the orifice and immediately therebeneath on the pan, or otherwise prevent regular and laterally even distribution of quantities on the discharge pan. It is therefore in this particular area that one of the novel features of the invention is concerned.

In this connection and in accordance with the present invention, a barrier or distribution member is provided in the form of a comb-like member or rake, which barrier is positioned above the discharge pan and operates to control the quantity, i.e. the thickness, of the cullet passing therebeneath as the pan rocks downwardly. Then, as the pan swings upwardly, the barrier acts to partially restrict further flow of the material which in turn acts to spread the on-coming material from the hopper laterally across the pan. Also, and during upward movement of the pan relative to the barrier or rake member, a further advantage is afforded in that cullet material at the forward edge of the pan is swept or brushed off the edge thereby clearing this area.

For these purposes, a comb-like member or rake, generally designated by the numeral 135, is pivotally supported on the hopper 50 by laterally spaced linkages 136 and maintained at a desired elevation above the discharge pan 100 by chain connections 137 from the frame structure 35. As herein provided, the member 135 includes an "L"-shaped member or angle iron 138 having leg portions 139 and 140. The linkage 136, as shown in FIGS. 3, 4 and 6, consists of rods 142 which are grooved at one end to receive plates 144 attached to the vertically disposed angle members 74, with the forked end of the rods and the inserted portion of the plates being provided with aligned bores to receive pivot pins 143. Adjacent their opposite ends, the rods are threaded and extend through openings in the leg portion 139 of the member 138. Nuts 145 provided on opposite sides of the leg portion 139 serve to secure this mounting connection.

At each end of the member 138, an eye-bolt 147, equipped with lock nuts 148, is located to which one end of the chain 137 is attached. At its opposite end, each chain 137 is attached to a similar eye-bolt 149, fixedly connected by nuts 150 to a bracket 39. Arranged lengthwise along the member 138 in equally spaced relation are a plurality of pegs or fingers 155. The pegs 155 are formed with threaded portions 156 and have lower hemispherically formed ends 157 and upper squared ends 158. Each peg is fixed in position in tapped openings in the leg 140 of the member 138 by means of pairs of nuts 160.

Initial adjustment of the distance of the rake generally from the discharge plate 105 is effected by shortening of the chain distance between eye-bolts 147 and 149 and minor adjustments effected by suitably turning the said eye-bolts with reference to the brackets 39 or the base element 138 and then re-tightening the respective pairs of nuts 148 and 150. In addition, adjustment of the elevation of each individual peg or finger 135 may also be made if desired by loosening the nuts 160, turning the squared ends 158 of the pegs 155 inwardly or outwardly and thereafter again locking the pegs in their adjusted position by tightening the nuts 160.

In use, the cullet feeding apparatus 15 is secured in spaced relation to the end wall 13 of the dog-house 11 by connection of the front lower channel 40 to the fixed bolts 44 carried by the structural beam 45. This also positions the open upper end of the hopper 50 beneath the supply outlet 121 communicating with the usual storage bins. The link coupling 128 is then connected to the crank 118 of the power unit 117 by the link 125.

Cullet glass which is thus delivered into the hopper 50 descends toward the orifice 63 at the lower end thereof, which orifice is defined in size by the hopper side walls 51, the lower edge 66 of the wall 52 and the adjusted elevation of the valve plate 70. From the hopper, the cullet is received on the plate 105 of the discharge pan 100 and falls forwardly against the pegs 155 and base member 138 of the rake member 135. As previously explained and as the pan is rocked toward its lowermost inclined position, a quantity of cullet glass will fall therefrom onto the trough 20 and thence into the upper area of the molten glass pool. Since the reciprocating movements of the pan occur continuously in closely spaced intervals of time, the cullet cannot accumulate excessively behind the rake member 135 but is permitted relatively free movement therebeneath in suitable regulated amounts. Coaction of the oscillating pan and the rake serves, however, to spread the cullet laterally to the end that as the space between the pegs 155 and the plate 105 is temporarily enlarged, a regulated quantity of cullet of substantially even height will be discharged to the trough 20. Then, as the plate rocks or swings upwardly, the pegs of the rake member cause a major portion of the cullet remaining on the forward edge of the plate to be cleared therefrom.

It is to be understood that the form of the invention herewith shown and described is to be taken as a preferred embodiment of the same, and that various changes in the shape, size and arrangement of parts may be resorted to without departing from the spirit of the invention.

I claim:

1. In an apparatus for delivering fusible material in broken or granular form from a source of supply thereof to the charging zone of a glass-melting tank-furnace, the combination including a frame, a delivery trough pivotally mounted on said frame intermediate said charging zone and said source of supply and having a discharge side disposed in the direction of said charging zone, means for continuously feeding said fusible material from said source of supply to said delivery trough, means for rocking said trough about a fixed axis between a first substantially horizontal position and a second position whereat said trough is inclined toward said charging zone for delivering said material thereto, and distribution means mounted on said frame above said delivery trough for apportioning said fusible material received from said source of supply substantially uniformly along said discharge side of said trough, said distribution means comprising a bar extending across and substantially parallel to said discharge side of said trough and including a plurality of fingers carried by said bar and projecting downwardly therefrom at spaced intervals therealong, said trough being in close proximity to the lower ends of said fingers when in said first position and being spaced a greater distance therefrom when in said second position, said bar being pivotally mounted on said frame above said delivery trough for movement toward and away from said discharge side of said trough about a second axis parallel to said fixed axis, said bar being urged by gravity downwardly toward said trough, and adjustable stop means acting between said frame and said bar for limiting said downward movement of the bar and defining a predetermined operating position for the bar while permitting free pivotal upward movement thereof away from said trough.

2. In an apparatus for delivering fusible material in broken or granular form from a source of supply thereof to the charging zone of a glass-melting tank-furnace, the combination including a delivery trough disposed intermediate said charging zone and said source of supply and having a discharge side in proximity to said charging zone, means pivotally mounting said trough to rock about a fixed axis between a first relatively level position and a second inclined position whereat said fusible material received from said source of supply moves across said trough toward said charging zone, and distribution means cooperatively associated with and extending across said delivery trough, said distribution means comprising a bar pivotally mounted above said trough for movement toward and away from said discharge side of said trough about a second axis parallel to said fixed axis, the bar including a plurality of fingers extending downwardly from said bar at spaced intervals therealong towards and adjacent the discharge side of said trough, said bar being urged by gravity downwardly toward said trough, and stop means for limiting said downward movement of the bar and defining a predetermined operating position for the bar while permitting free pivotal upward movement thereof away from said trough, said distribution means being effective to apportion said fusible material substantially uniformly along said discharge side of said trough.

3. In an apparatus for delivering fusible material in broken or granular form from a source of supply thereof to the charging zone of a glass-melting tank-furnace, the combination including a frame, a delivery trough pivotally mounted on said frame intermediate said charging zone and said source of supply and having a discharge side disposed in the direction of said charging zone, means for continuously feeding said fusible material from said source of supply to said delivery trough, means for rocking said trough about a fixed axis between a first substantially horizontal position and a second position whereat said trough is inclined toward said charging zone for delivering said material thereto, and distribution means mounted on said frame above said delivery trough for apportioning said fusible material received from said source of supply substantially uniformly along said discharge side of said trough, said distribution means comprising a bar extending across and substantially parallel to said discharge side of said trough and including a plurality of fingers carried by said bar and projecting downwardly therefrom at spaced intervals therealong, said trough being in close proximity to the lower ends of said fingers when in said first position and being spaced a greater distance therefrom when in said second position, and said fingers being adjustably carried by said bar for individual selective movement relative thereto toward and away from said trough.

4. Apparatus for delivering fusible material in broken or granular form as defined in claim 1, wherein said adjustable stop means includes a pair of spaced flexible members secured at one end to said frame and at their opposite ends to said bar.

5. Apparatus for delivering fusible material in broken or granular form as defined in claim 2, wherein a fixed trough is provided and mounted between said rocking trough and the charging zone of the furnace, said fixed trough being inclined toward said charging zone and adapted to receive material at the upper side thereof from said rocking trough and carry same into said furnace charging zone.

6. Apparatus for delivering fusible material in broken or granular form as defined in claim 3, wherein said means for continuously feeding said fusible material to said trough includes a hopper having a discharge opening positioned above said trough, and a valve plate mounted for sliding movement relative to said discharge opening for varying the area thereof.

7. Apparatus for delivering fusible material in broken or granular form as defined in claim 3, wherein a fixed trough is provided and mounted between said rocking trough and the charging zone of the furnace, said fixed trough being inclined toward said charging zone and adapted to receive material at the upper side thereof from said rocking trough and carry same into said furnace charging zone.

8. Apparatus for delivering fusible material in broken or granular form as defined in claim 7, wherein the discharge side of said pivotally mounted trough and the upper material receiving side of said fixed trough are substantially coextensive.

References Cited by the Examiner
UNITED STATES PATENTS

| | | |
|---|---|---|
| 448,853 | 3/1891 | Corey. |
| 1,901,002 | 3/1933 | Ross _____ 222—406 |
| 2,395,089 | 2/1946 | Arelt. |
| 2,741,401 | 4/1956 | Kehres et al. _____ 222—561 X |

FOREIGN PATENTS

| | | |
|---|---|---|
| 723,422 | 2/1955 | Great Britain. |

HUGO O. SCHULZ, *Primary Examiner.*